United States Patent
Servi et al.

[11] Patent Number: 5,381,546
[45] Date of Patent: Jan. 10, 1995

[54] CONTROL PROCESS FOR ALLOCATING SERVICES IN COMMUNICATIONS SYSTEMS

[75] Inventors: Leslie D. Servi, Bedford; Julian Keilson, Watertown, both of Mass.

[73] Assignee: GTE Laboratories Incorporated, Waltham, Mass.

[21] Appl. No.: 31,081

[22] Filed: Mar. 11, 1993

Related U.S. Application Data

[63] Continuation of Ser. No. 477,266, Feb. 8, 1990, abandoned, which is a continuation-in-part of Ser. No. 348,616, May 5, 1989, abandoned, which is a continuation of Ser. No. 37,373, Apr. 13, 1987, abandoned.

[51] Int. Cl.[6] .............................................. G06F 9/46
[52] U.S. Cl. ........................... 395/650; 364/DIG. 1; 364/224; 364/224.21; 364/223; 364/242.2; 364/254.5; 364/281.3; 364/281.6; 364/281.7; 364/281.8
[58] Field of Search ........... 395/650, DIG. 1, DIG. 2

[56] References Cited

U.S. PATENT DOCUMENTS

| | | | |
|---|---|---|---|
| 4,604,694 | 8/1986 | Hough | 364/200 |
| 4,646,231 | 2/1987 | Green et al. | 364/200 |
| 4,908,750 | 3/1990 | Jablow | 364/200 |
| 5,031,089 | 7/1991 | Liu et al. | 364/200 |

*Primary Examiner*—Gareth D. Shaw
*Assistant Examiner*—Kakali Chaki
*Attorney, Agent, or Firm*—Lawrence E. Monks

[57] ABSTRACT

A process for scheduling a processor, in a stored program digital switch of a telecommunications network having heterogeneous types of task, utilizes preassigned probability parameters to schedule the tasks for the processor to serve to meet a system objective. For n types of tasks, each having one of n probability parameters $P_i$ where $0 < P_i < 1$, the system first serves a type i task, then if queue i is empty, it serves a type i+1 modulus (n) task. If queue i is not empty, with a probability $P_i$ it serves another type i task and with a probability $1-p_i$ it serves a type i+1 task modulus (n) until a type i+1 task modulus (n) until a type i+1 task is served. Thus the processor continually cycles through all types of tasks.

2 Claims, 4 Drawing Sheets

CONTROL PROCESS FOR ALLOCATING SERVICES IN COMMUNICATIONS SYSTEMS

CROSS-REFERENCE TO RELATED APPLICATION

This is a continuation of copending application Ser. No. 07/477,266 filed on Feb. 8, 1990 now abandoned, which is a continuation-in-part of prior application Ser. No. 07/348,616, filed May 5, 1989 entitled CONTROL FOR RATIONING SERVICES AMONG DEMANDS WITH MULTIPLE PRIORITIES, now abandoned, which was a continuation of prior application Ser. No. 07/037,373, filed Apr. 13, 1987, now abandoned, said prior applications having the same inventors and assigned to the same assignee as the present application.

BACKGROUND OF THE INVENTION

This application pertains to the field of communications generally, and in particular to communication networks which interconnect a plurality of user stations and share a common resource. Specifically, it pertains to the allocation and scheduling of processor in a multi-queue system in which the service capabilities of the processor are shared by the various queues in the system, the queues having heterogeneous types of tasks with differing priorities, such as the allocation of real time operation of a data processor in a large telephone switching center, or the allocation of bandwidth of the bus of a local area network.

Communication networks range in scope from small local area networks connecting a few telephones or personal computers to the world-wide public switched telephone network. Regardless of size, as networks increase in complexity more sophisticated resource allocation policies become necessary. The allocation of a single resource to many requests for its use is critical to the central processor in a network switch. The result of the resource allocation scheme must be the optimization of a projected cost function. Similar concerns affect comparable resource allocation schemes for smaller networks, in which performance improvement or system optimization yields an improvement in a projected cost function.

The present invention is concerned primarily with networks under the control of a processor unit, usually a digital computer, having heterogeneous traffic, tasks or requests for service. Specifically, it is concerned with one aspect of the task profile, namely the priority assigned to each type of task, and the measure of system performance for that aspect, namely the response time or average mean delay of service for tasks in each queue. In a network having heterogeneous classes of traffic with multiple priorities, there is a danger that high priority traffic will continually preempt lower priority traffic, leading to the situation in which the low priority traffic is served after an inordinately long delay.

An example is the allocation of a processor's time within a large switch. Such systems may be modeled by a server, representing the processor, attending to the entries of two or more queues that arrive randomly and have random service requirements, as illustrated in FIG. 1. The entries might represent voice and/or data telecommunication traffic or internal messages from one part of the processor to another. The statistical characteristics of the traffic could be quite varied: if the entries are voice circuit-switched calls, then the arrival pattern might be random and its duration random, with an average of a few minutes. On the other hand, if the entries are a digitalized data stream the inter-arrival time might be non-random and its duration much longer or much shorter than a few minutes, depending on its specific application. The scheduling problem of concern in this application is that of deciding in which order the entries should be processed in order to optimize the system's overall performance while taking into account the effects of the randomness in the system.

Hereinafter, the network traffic and other requests for processor service will be called tasks and the different classes of traffic will be called types of tasks. Different types of tasks will be said to be in different queues.

A number of resource allocation or control schemes which involve control of access to a network computer and optimization of message routing through a network have been proposed and to some extent implemented in various networks. Some of these control schemes include one or more schemes for resolution of the conflicts which can arise from multiple priorities. This aspect of the problem can be generalized to the scheduling of network resources to provide minimally adequate service to all users of a network. The prior art discloses a number of alternative techniques for scheduling the services of a network and/or its processor. Five prior art schedules are discussed in the following paragraphs.

In a communication network using an exhaustive service schedule, all customers are served from a first queue until the queue is empty before any customers are served from the next queue. Stated in other terms, for $i=0, 1, 2, \ldots, n-1$ (where n represents the number of different tasks in a system), the processor serves type i tasks until no more are available, and then serves type $(i+1)$ modulus (n) tasks. This schedule suffers from a number of disadvantages. It does not permit the allocation of priority among the tasks. If the queue presently being served has a very low priority, service cannot be interrupted for an incoming high priority task. Another disadvantage is that the average delay of service, i.e., waiting time, of a type i task might be severely increased when the number of type j tasks, where $j \neq i$, requiring service increases sharply. A further disadvantage is that such a schedule has no free parameters, thus does not permit real-time continuous variable control.

In a communication system using a gated schedule, all customers are served from a first queue who had arrived on that queue before service for the first customer of that queue started, and then customers on the next queue are served similarly. In other words, during each cycle, for $i=0, 1, 2, \ldots, n-1$, (where n represents the number of different types of tasks in a system), the processor serves all of the type i tasks that arrived before the first type i task was served and then the processor serves the type $(i+1)$ modulus (n) tasks. A gated schedule has the disadvantage that it does not permit the allocation of priorities among the tasks, and the disadvantage that it has no free parameters for real-time continuous variable control.

In a communication system using a clocked schedule, the processor serves all customers from a first queue until the queue is empty, and then proceeds to serve customers on the next queue, as it would do on an exhaustive service schedule, discussed above, except with the modification that after every time period t (where t is prespecified) the processor stops what it is doing and returns to the first queue. This type of schedule suffers from the same disadvantages as the exhaustive service schedule plus the further disadvantage that its performance cannot be analytically analyzed. Therefore some undesirable uncertainty on the part of the system designer is incurred. It also suffers the further disadvantage that the implementation of such a schedule requires that the processor store in memory information about the past activities of the system, that is, the schedule is not memoryless.

In a communication system using a limited service schedule, the processor serves up to a prespecified number of customers on a first queue, then proceeds to serve up to a prespecified number on the next queue, cycling through all the queues in the system continuously. In other words, for $i = 0, 1, 2, \ldots, n-1$, (where n represents the number of different types of tasks in a system), the processor serves up to $m_i$ type i tasks (where $m_i$'s are prespecified integers) and then serves type $(i+1)$ modulus (n) tasks. This type of schedule suffers from the disadvantage that it has no free parameters for real-time continuous variable control. It also suffers from the disadvantage that it cannot be analytically analyzed. And this schedule is also not memoryless.

In a communication system using a strict priority schedule, the processor serves all customers on a queue having one priority only when there are no queues of customers having a higher priority. In other words, for $i = 0, 1, 2, \ldots, n-1$, (where n represents the number of different types of tasks in a system), the processor serves type i tasks only when there are no type $1, 2, \ldots i-1$ tasks that need service. The strict priority schedule suffers also from the disadvantage that the average delay of service of a type i task might be severely increased when the number of type j tasks, where $j < i$, requiring service, increases sharply. The strict priority schedule also has no free parameters to allow real-time continuous variable control.

SUMMARY OF THE INVENTION

The principle object of the present invention is to provide a system for controlling the allocation of service among classes of requests for service by scheduling the performance of different types of tasks having different priorities based upon probabilities.

Another object of this invention is to provide for a new probabilistic schedule that can be used in a real-time control process incorporated into communication systems.

Still another object of this invention is to provide for a new probability schedule which has significant commercial value and permits the optimization of a projected cost function for both local area networks and a processor schedule within a local telephone switch.

Yet another object of this invention is to provide for a new priority schedule that offers superior performance over the prior art, especially in the minimization of a weighted average of the waiting times of tasks of differing priorities.

In accordance with a first aspect of this invention, in a multi-queue system having a processor serving n heterogeneous queues of demands for service, the process is implemented in the processor by preassigning probability parameters $p_0, p_1, p_2, \ldots, P_{n-1}$, which parameters are each between 0 and 1, $(0 \leq p_i \leq 1)$, to the n queues respectively. In a first step the processor serves a type 0 demand from the first queue, of the n queues of demands. If the first queue is not empty after the first type 0 demand has been served, then with a probability of $p_0$, the preceding step is repeated, that is, another demand from the first queue is served, or with a probability $1 - p_0$, a type 1 demand from the second queue of the n queues is served. These steps are repeated until a type 1 demand is served. If the first queue is empty after the first type 0 demand is served, then with a probability of 1 a type 1 demand from the second of the n queues is served. In general, for $i = 0, 1, 2, \ldots, n-1$, modulus (n) the processor serves a first demand from the ith queue. If the ith queue is empty, it then serves the $(i+1)$ modulus (n) queue. If the ith queue is not empty, with a probability $P_i$ it serves another demand on the ith queue, and with a probability $1 - p_i$ it serves a demand on the $(i+1)$ modulus (n) queue, repeating the process until a demand from queue $i+1$ is served. The process is repeated for all succeeding queues, as the processor cycles through queues $0, 1, 2, \ldots, n-1$.

In accordance with a second aspect of this invention, a process for selecting which queue of customers to serve in a stored program digital switch of a telecommunications network, is implemented in a network control center by preassigning probability parameters $p_0, p_1, p_2, \ldots, P_{n-1}$, which parameters are each between 0 and 1, $(0 \leq p_i \leq 1)$, to the n queues respectively. In a first step, the switch serves a type 0 source-destination request from the first queue, of the n queues of requests. If the first queue is not empty after the first type 0 request is served, then with a probability $p_0$ the preceding step is repeated, that is, another request from the first queue is served, or with a probability $1 - p_0$, a type 1 request from the second queue of the n queues is served. If the first queue is empty after the first type 0 request is served, then with a probability 1 a request from the second of the n queues is served. In general, for $i = 0, 1, 2, \ldots, n-1$, modulus (n), the processor serves a first source-destination from the ith queue. If the ith queue is empty, it then serves the $(i+1)$ queue modulus (n). If the ith queue is not empty, with a probability $p_i$ it serves another source-destination request from the ith queue and with a probability $1 - p_i$ it serves a source-destination request from the $(i+1)$ modulus (n) queue, repeating the process until a source-destination request from queue $i+1$ is served. The process is repeated for all succeeding queues, as the processor cycles through queues $0, 1, 2, \ldots, n-1$.

DESCRIPTION OF THE PREFERRED EMBODIMENTS

A computer serving a network switching system in a telephone network performs many tasks. While it is primarily used to switch source-destination service requests to an available trunk group, it also is responsible for data collection, data analysis, network diagnostics and plant maintenance. Hence, many types of tasks, each having its own priority, must be served by the computer resource. The allocation of the computing resources to these tasks is the subject of the present application.

Figure 1:
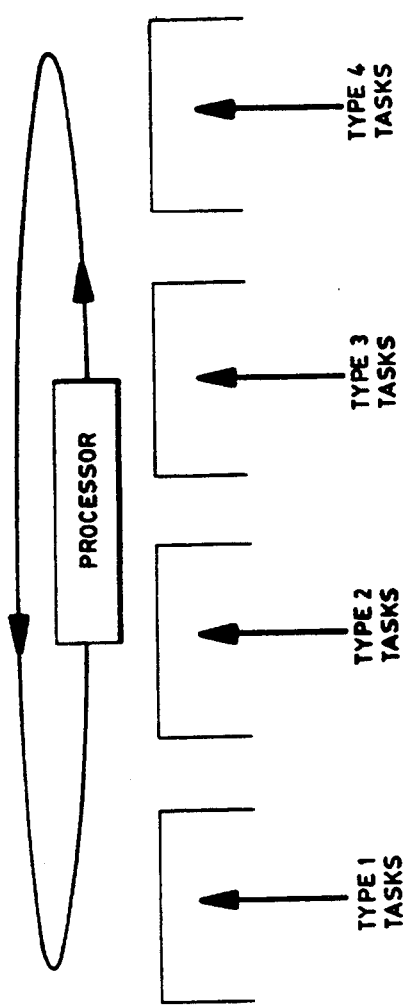
FIG. 1 is a diagram representing a cyclic service queue.
Figure 2:
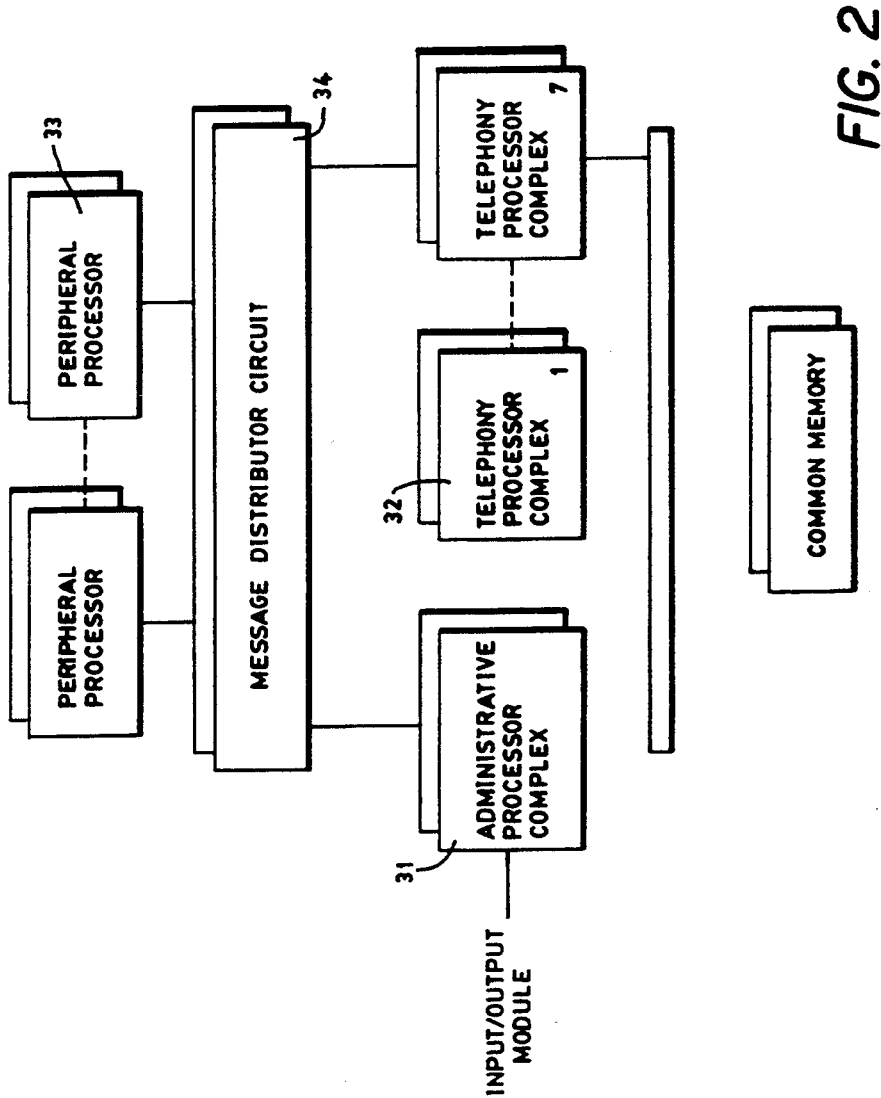
FIG. 2 is a block diagram of one stored program control digital telephone switch.

FIG. 2 is a block diagram of the central control equipment unit 30 of the GTD-5 EAX, made by GTE Automatic Electric Incorporated, now AG Communications, Phoenix, Ariz. This is a stored program control digital switching unit for Class 5 and Class 4/5 applications adaptable to various central office sizes in a telephone system. As shown in FIG. 2, there are three types processors, 31, 32, 33, shown in the central control equipment 30. The call processing functions performed by these processors are shown in Table 1.

TABLE 1

ALLOCATION OF CALL PROCESSING FUNCTIONS TO PROCESSOR TYPE FUNCTION

| Function | Processor Type | | | | | | |
|---|---|---|---|---|---|---|---|
| | AP | TP | TCU | RSU | RLU | MXU | CDL |
| line control | | | C | C | C | CU | |
| PTS trunk control | | X | | | | | |
| CCIS | | | | | | | X |
| service circuit control | | | SP | SBS | | | |
| time switch and tone control | | | C | C | | | |
| concentration | | | C | C | C | CU | |
| call sequencing | | SP | | SBS | | | |
| digit analysis | SB | SP | | SBS | | | |
| routing | SB | SP | | SBS | | | |
| charge data collection | | X | | | | | |
| configure network | SP | SB | | SBS | | | |
| logical device control | C | C | | SBS | | | |
| device usage control | SP | SB | | SBS | | | |
| resource administration | SP | | | SBS | | | |
| charge data output | X | | | | | | |

KEY:
C = common function
CU = common function, unique implementation
SB = subset of common function, conditional compilation and/or different data
SP = superset of common function
SBS = subset of common function used only during survivability
X = unique location of function Each of these functions is one type of task. Some of the processors of Table 1 are not in central control unit 30. These processors must routinely and periodically run diagnostic programs, maintenance reports and billing data. Thus, each switch has a variety of tasks to perform, each with its own priority, which priority may change in the course of time or unexpected events occurring in the network. The function of the control process for service allocation of the present invention is to schedule these various tasks of the individual intelligent switch processors to meet predefined network performance objectives.

Figure 3:
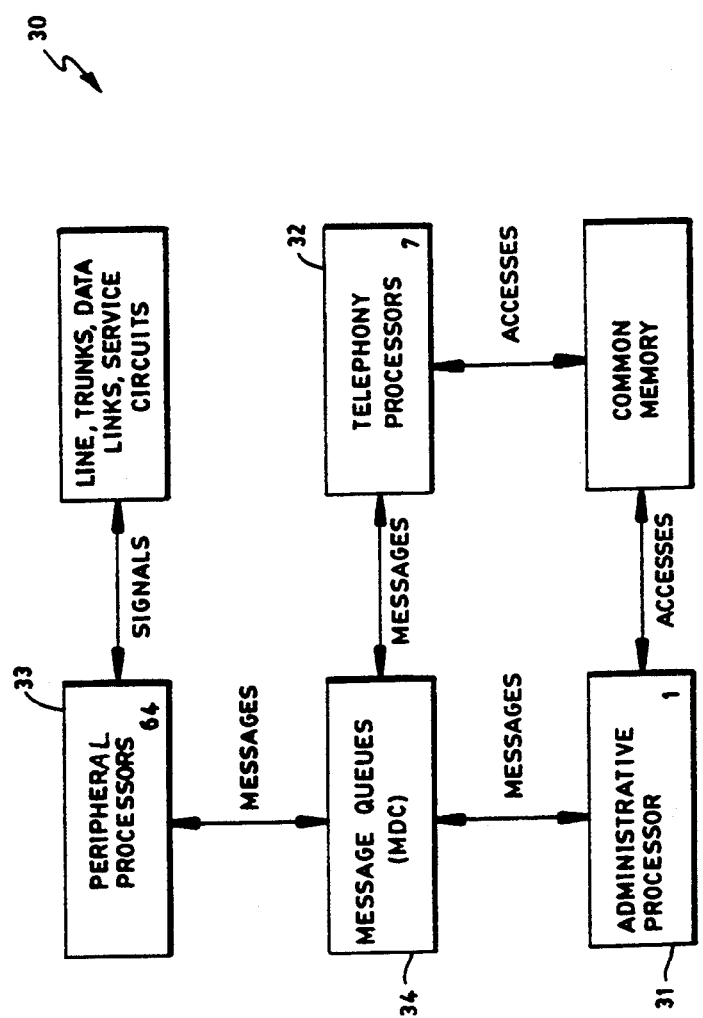
FIG. 3 is a block diagram of the switch of FIG. 2 showing traffic between the processors of that switch.

Of special current interest is the Administrative Processor Complex (APC) 31 of the GTD-5 which must allocate its real time among two or more classes of traffic, each distinguished by different traffic statistics and different priorities. The Administrative Processor Complex (APC) 31 is one of three different types of processors within the GTD-5. FIG. 3 illustrates the interaction of the different processors. The APC 31 handles system I/O, maintenance control memory update control, data collection, and data analysis (2). The Telephony Processor Controls (TPC) 32 perform the process control tasks for call processing, whereas the Peripheral Processors (PP) 33 handle device control and the interface between the lines, trunks, data links, and service circuits and the rest of the switch. The processors interact through message distribution and memory sharing. Messages are sent and received between processors via a set of queues located in the Message Distributor Circuit (MDC) 34.

The APC's real-time requirements tend to increase with increasing traffic level. Some of the administrative tasks are of a higher priority than others. However, the needs of the high-priority tasks must be balanced, with the recognition that it is a high priority for the low-priority tasks not to have excessively large average delays.

The probability schedule according to the process of this invention is implemented by prespecifying a set of n numbers $p_0, p_1, \ldots, p_{n-1}$, which are each between 0 and 1 inclusively ($0 \leq p_i \leq 1$), called probability parameters. These probability parameters are assigned to each of the n queues according to the operational objectives of the system and typically reflect relative priorities of the class of traffic or type of customer or task in each queue. For example, one central office digital switch in a telecommunications system may be reconfigured in the event of a failure at another switch having a number of different priorities. And it may have the usual range of diagnostic, maintenance and billing functions, some of which are low utilization and some of which are high utilization. In this context utilization refers to the relative frequency of demands for processor time for each type of task. For purposes of illustration, we will assume the following profile of tasks and the probability parameters assigned to each type of task for the maximization of revenues and minimization of mean delay times to prevent defections from the network:

| Task Type | Utilization | Probability Parameters |
|---|---|---|
| System I/O | Very High | $p_0 = 1.0$ |
| Memory Update Control | Medium | $p_1 = 0.8$ |
| Data Analysis | Very Low | $p_2 = 0.6$ |
| Data Collection | High | $p_3 = 0.4$ |
| Maintenance Control | Low | $p_4 = 0.2$ |

It can be shown mathematically that the average mean delay time of each type of task will be a function of the arrival rate, the statistical properties of the service time and the probability parameters, and changeover time at any period of time. In this example, system I/O tasks are served exhaustively, and memory update tasks are served nearly exhaustively. By assigning a relatively high probability parameter to a medium utilization class such as memory update control, this class will also be served almost exhaustively, while the mean average time of delay system-wide will diminish. The assignment of probability parameters to achieve system objectives has been discussed in the literature, for example, "Average Delay Approximation of M/G/1 Cyclic Service Queues with Bernoulli Schedules", L. D. Servi, IEEE Journal on Selected Areas in Communications, Vol. SAC-4, No. 6, September 1986.

The probability parameters having been preassigned, the process proceeds according to the following steps. The processor of the central switch serves a request from the first queue hereinafter called a type 0 request.

With a probability $p_0$ the processor serves the next type 0 request, if there is one available, and with a probability $(1 - p_0)$ the processor serves a request from the next queue, a type 1 request. This process continues until a type 1 request is served.

Then, with a probability $p_1$ the processor serves another type 1 request, if there is one available, and with a probability $(1-p_1)$ the processor serves a request from the third queue, a type 2 request. This process continues until a type 2 request is served.

The processor repeats this procedure for type 4, 5, ..., n−1 and then type 0 requests, as it cycles through the queues according to their respective priorities. To generalize, for i=0, 1, 2, ..., n−1, modulus (n), the processor serves a first service request from the ith queue. If the ith queue is empty, it then serves the (i+1) modulus (n) queue. If the ith queue is not empty, with a probability $p_i$ it serves another request from the ith queue, and with a probability $1-p_i$ it serves a request from the (i+1) modulus (n) queue, repeating the process until a service request from queue i+1 modulus (n) is served. The process is repeated for all succeeding queues, as the processor cycles through queues 0, 1, 2, ..., n−1. The processor of an intelligent central telecommunications switch uses this process to schedule its service to customers and/or users.

The above-described probability schedule in accordance with this invention requires that the processor can generate random numbers to select one of the two probabilities, $p_i$ or $1-p_i$. The implementation of a random (or pseudo-random) number generator in a digital processor is well known in the art. To select one of two probabilities $p_i$ or $1-p_i$, each of which is a real number between 0 and 1, such that $0 \leq p_i \leq 1$, the processor generates random numbers r uniformly distributed between 0 and 1. At each selection, the random number r which is generated will be less than or equal to $p_i$ with probability $p_i$, and the event associated with that probability will occur. Any other means for the processor to make a random selection between $p_i$ and $1-p_i$ may be utilized in the invention.

A principal feature of this invention is the use of probabilities to implicitly allocate priorities utilizing continuous variables, that is, non-integer variables. Continuous variables provide a means to implement a control, such as gradient methods, that would not be possible if integer control variables are used.

A second feature of the invention is that its implementation does not require storage in memory of any information concerning the past performance of the system.

Figure 4:
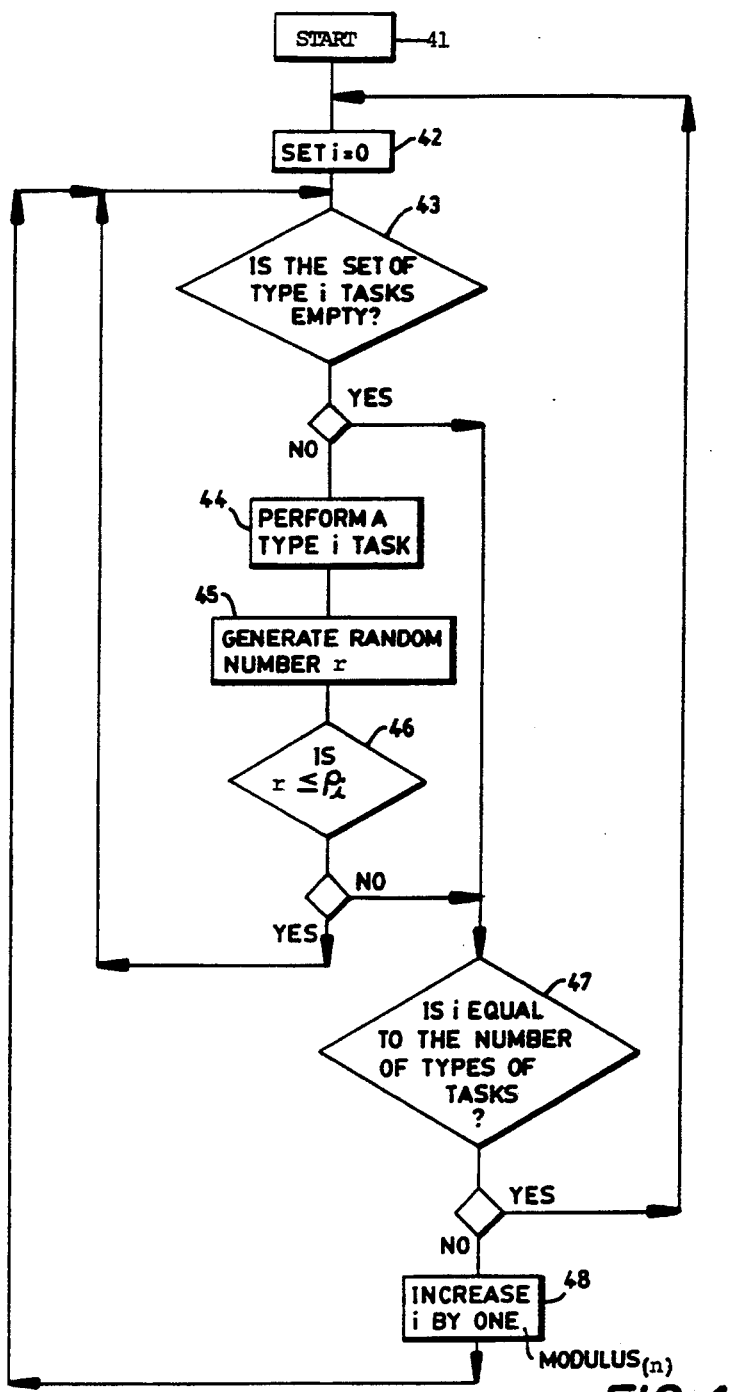
FIG. 4 is a block diagram of the control process for allocating service according to the invention.

FIG. 4 is a flow chart depicting the process of the present invention. The processor has to service requests from n queues, where $n \geq 2$, each queue n, i=0, 1, 2, ..., n−1, having its own respective priority expressed by a probability parameter $p_i$, where $0 \leq p_i \leq 1$. The present invention provides a means to schedule the service of the processor so that all requests for service are met while minimizing the mean delay time of the system. To start the system (box 41), the processor sets i=0 (box 42), and checks to see if the queue of type i requests is empty (box 43). If the queue i is not empty, the processor selects a type i (highest available priority) request for service and serves it (box 44). To determine the next request to be served according to the probability schedule of the present invention, the processor must make a random choice. It first generates a random number r, uniformly distributed between 0 and 1, (box 45). Then, with a probability $p_i$, $r \leq p_i$, box 46, the process returns to box 43. Else, with a probability $1-p_i$ (box 45) $r > p_i$ and the process then checks to see if i=n, the number of queues, box 47. If yes, all queues have been served and the process returns to box 12 to cycle through queues 0, 1, 2, ..., n−1 again. Otherwise, the process increases i by one (box 48) and then serves the i+1 modulus (n) queue, box 43.

While the present inventors have constructed a new method for resource scheduling problems, it is to be understood that the claims of this invention relate only to the application of this novel method to arrangements that determine the optimum allocation or scheduling of resources in real world technological and industrial systems that lend themselves to a probabilistic representation of the variables and constraints characterizing the system, i.e., physical arrangements that determine how resources are actually applied to optimize the performance of processes, machines, manufactures or compositions of matter. All other uses of the new method, such as queuing theory research, or operations research activities, form no part of the present invention. Similarly, use of the new method in non-technological or non-industrial systems likewise form no part of the present invention.

What is claimed is:

1. A process executed by a computer for selecting by said computer a next sequential task to be allocation service of a computer processor while scheduling the allocation of services of the computer processor among two or more queues of tasks wherein said queues $Q_i$ are sequentially numbered for i equal to 0, 1, 2, ..., n−1, comprising the steps of:

receiving by said computer probability parameters $p_0$, ... $p_{n-1}$, where $0 \leq p^i \leq 1$ for indicating the relative priorities of said queues $Q_i$;

assigning by said computer each of said probability parameters $p_i$ to a respective queue $Q_i$;

selecting by said computer a task from queue $Q_i$ for allocation of service of said computer processor determining by said computer if there is at least another task in queue $Q_i$;

selecting by said computer a task from queue $Q_{i+1}$ modulus (n) for allocation of service of said computer processor, having no other task in queue $Q_i$;

performing the following steps if there is at least another task in queue $Q_i$;

generating by said computer a random number M where $0 \leq M \leq 1$;

comparing by said computer said random number M to said probability parameter $p_i$;

selecting by said computer the next sequential task to be allocated service of the computer processor, from said tasks in the next sequential queue $Q_{i+1}$ modulus (n) if $M > p_i$ and selecting by said computer the next sequential task to be allocated service of the computer processor, from said tasks in queue $Q_i$ if $M < p_i$.

2. A computer for selecting a next sequential task to be allocated service of a computer processor while scheduling the allocated of services of the computer processor among two or more queues of tasks wherein said queues $Q_i$ are sequentially numbered for i equal to 0, 1, 2, ..., n−1, comprising the steps of:

means for receiving by said computer probability parameters $p_0$, ..., $p_{n-1}$, where $023\ p^i \leq 1$ for indicating the relative priorities of said queues $Q_i$;

means for assigning by said computer each of said probability parameters $p_i$ to a respective queue $Q_i$;

means for selecting by said computer a task from queue $Q_i$ for allocation of service of said computer processor;

means for determining by said computer if there is at least another task in queue $Q_i$;

means for selecting by said computer a task from queue $Q_{i+1}$ modulus (n) for allocation of service of said computer processor, having no other task in queue $Q^i$;

means for generating by said computer a random number M where $0 \leq M \leq 1$;

means for comparing by said computer said random number M to said probability parameter $p_i$ if there is at least another task in queue $Q_i$;

means for selecting by said computer the next sequential task to be allocated the computer processor if there is at least another task in queue $Q_i$, from said tasks in the next sequential queue $Q_{i+1}$ modulus (n) If $M > p_i$, and means for selecting by said computer the next sequential task to be allocated service of the computer processor, from said tasks in queue $Q_i$ if $M < p_i$.

* * * * *